United States Patent [19]

Heston

[11] Patent Number: 4,595,371
[45] Date of Patent: Jun. 17, 1986

[54] POWER TAKE-OFF SYSTEM FOR MARINE ENGINES

[76] Inventor: Scott Heston, 1233-79th Street, S., St. Petersburg, Fla. 33707

[21] Appl. No.: 567,168

[22] Filed: Dec. 30, 1983

[51] Int. Cl.⁴ ............................................. F16D 21/04
[52] U.S. Cl. .......................................... 440/75; 440/4; 192/51
[58] Field of Search ................. 440/75, 4; 192/21, 51, 192/48.8; 474/1, 69; 74/355, 404, 329, 333, 376, 377, 361, 674

[56] References Cited

U.S. PATENT DOCUMENTS

| | | | |
|---|---|---|---|
| 1,152,567 | 9/1915 | Spear | 440/4 |
| 2,282,612 | 5/1942 | Schultz | 440/4 |
| 2,556,318 | 6/1951 | Cooper | 74/361 |
| 2,911,843 | 11/1959 | Mitchell | 74/361 |
| 3,155,070 | 11/1964 | Jebens | 440/4 |
| 3,304,906 | 2/1967 | Nace | 440/4 |
| 3,469,556 | 9/1969 | Campbell | 440/4 |
| 3,548,987 | 12/1970 | Erickson | 192/51 |
| 3,675,748 | 7/1972 | Hansen | 74/361 |
| 3,766,794 | 10/1973 | Wilcox | 74/355 |
| 4,188,837 | 2/1980 | Bendall | 440/75 |
| 4,309,914 | 1/1982 | Hiersig | 440/4 |
| 4,318,702 | 3/1982 | Stacey | 440/75 |
| 4,331,432 | 5/1982 | Blanchard | 440/75 |
| 4,369,673 | 1/1983 | Odell | 74/674 |

OTHER PUBLICATIONS

A Reversible Double-Drive Clutch, by Kotter, 10/14/72.

Primary Examiner—Trygve M. Blix
Assistant Examiner—C. T. Bartz
Attorney, Agent, or Firm—Thomas I. Rozsa

[57] ABSTRACT

The present invention relates to a new type of marine power take-off system which increases the performance of the V-hull type boat, while not increasing the engine compartment space. The present invention enables the boat manufacturer to mount the engines side-by-side to provide increased passenger space in the boat, while at the same time permitting the propellers to be lower in the water and closer to each other than with conventional designs of side-by-side engines.

The power take-off system of the present invention combines the boat's transmission with a chain drive assembly adjacent the transmission. Through use of the novel design of the present invention, the output shaft of the power take-off system leading to the propeller is much lower and offset from the location of the center of the engine input shaft.

14 Claims, 10 Drawing Figures

POWER TAKE-OFF SYSTEM FOR MARINE ENGINES

Propeller location is very significant. A key principle in performance is that the closer the propellers are located together, and the lower the propellers are in the water, the better the control of the boat and the faster the speed of the boat.

A problem arises when mounting the engines to the transome in the side-by-side design. Since the engines are wide, the engine shafts and therefore the propeller attached to each shaft, is spaced wide apart from the other propeller. This distance between propellers reduces the boat's performance. This problem is magnified in boats which contain a V-hull design. Since the engines are placed side-by-side, they must be located higher from the water line in order to fit into the V-hull design. Since the engines are mounted higher, the propellers are naturally mounted higher. Since boats have a natural tendency to leave the water, the higher propeller location affords more opportunity for the propeller to also leave the water. If maximum performance is desired, the propellers must not leave the water.

Steering and trim characteristics are also affected. The higher location of the propellers also results in a loss of control. In general, the propellers and the outdrive to which the propellers are attached, act as a rudder to steer the boat. If the propellers are located higher in the water, the tendency of the boat coming out of the water results in times during operation of the boat where no rudder, and hence no steering capability, exists. This higher location also affects the trim capability of the boat, since the trim adjustment lies within the movement of the outdrive. If the outdrive leaves the water, the trim cannot be controlled by the driver.

The present invention addresses the problem of maintaining engine efficiency while at the same time creating an apparatus which lowers the depth of the propellers in the water. In this way, engines can be spaced side-by-side to improve passenger space in the boat while, the propellers are lower in the water to overcome the problems set forth above.

DESCRIPTION OF THE PRIOR ART

No complete solution to the above-described loss of performance exists in the prior art. Two attempted solutions known in the prior art are (1) the staggered engine principle, and (2) the chain box mechanism.

In the staggered engine principle, the engines are placed one in front of the other, rather than side-by-side. Staggering the engines in this manner allows the propellers to be placed closer together, thereby resulting in increased performance. The major drawback in using this staggering technique is that twice the lengthwise space is needed for the engine area since they are front-to-back instead of side-to-side. This results in a significant loss of passenger room in the boat.

The other attempted solution known in the prior art is the chain box or Z-drive assembly. In this embodiment, the engines are once again side-by-side. In a conventional system, the engine is attached to the transmission (inside the boat), which in turn is attached to the propeller (through an outdrive outside of the boat), all in a generally straight line. The chain box or Z-drive modifies this arrangement as follows. The engine output shaft is connected to the transmission. The transmission output shaft protrudes through the transom of the boat and is connected to a chain drive sprocket. This sprocket is located in the top portion of a chain box housing. Another sprocket is located below the transmission output sprocket and is connected by a shaft to the propeller. The two sprockets are connected together with a chain inside the chain box housing. This arrangement has the effect of allowing the propellers to be lower in the water. A major problem with this arrangement is that the chain box parts are subject to significant corrosion and also to substantial vibration forces. The result is substantial downtime and repair costs. In addition, since the chain box is added to the driveline, it adds considerable weight to the boat. In addition to these engineering problems, the chain box or Z-drive assembly has two commercial disadvantages. First, the assembly is prohibitively expensive. Second, in this design the outdrive is attached to the chain housing, thereby eliminating a choice of outdrive systems that would best suit the design needed. The design has significant disadvantages when used with a V-hull design.

Therefore, there is no standard transmission drive for marine engines known in the prior art which increases boat performance by enabling the propellers to be closer together and lower in the water, while at the same time affording a side-by-side engine layout to thereby increase passenger space.

SUMMARY OF THE PRESENT INVENTION

The present invention relates to a new type of marine power take-off system which increases the performance of the V-hull type boat, while not increasing the engine compartment space. The present invention enables the boat manufacturer to mount the engines side-by-side to provide increased passenger space in the boat, while at the same time permitting the propellers to be lower in the water and closer to each other than with conventional designs of side-by-side engines.

The power take-off system of the present invention combines the boat's transmission with a chain drive assembly adjacent the transmission. Through use of the novel design of the present invention, the output shaft of the power take-off system leading to the propeller is much lower and offset from the location of the center of the engine input shaft.

It has been discovered, according to the present invention, that if the transmission and the chain drive assembly are combined in a common housing which is then bolted directly to the rear of an engine, then the alignment problem between the transmission and the chain box is eliminated. In addition, by having the parts integrally housed in a single unit inside the hull of the boat, exposure to water (and attendant corrosion) and to vibration forces is significantly reduced. In addition, this combination also significantly reduces the weight of the overall system by eliminating heavy shafts and other connecting members.

It has additionally been discovered, according to the present invention, that if the transmission and chain drive assembly are combined into a single unit wherein the chain drive assembly directly lowers the propeller shaft and enables it to be offset from the engine shaft, then a significant amount of complicated, costly and heavy apparatus can be eliminated, while producing the desired result of a lower propeller location and having propellers close to each other.

It has further been discovered, according to the present invention, that if the transmission and chain drive assembly are combined into one housing unit, this embodiment allows any type of outdrive system to be used to allow the best possible performance of the boat.

It has also been discovered, according to the present invention, that if the transmission and chain drive assembly are combined into one unit so that the output shaft is lower than the engine flywheel input shaft, then the propellers can be set lower in the water and also arranged so that they are closer together, thereby improving the performance characteristics of the boat and also improving the fuel efficiency of the engines.

It has further been discovered, according to the present invention, that if the output shafts are interconnected to a differential, then two engines can be used to power a single driveshaft and propeller, thereby increasing the power imparted to the propeller.

It is therefore an object of the present invention to provide an improved power take-off system which is used in conjunction with a transmission of a marine engine to enable the power output shaft which leads to the propeller to be substantially lower than the plane of the flywheel from the engine, to thereby allow the propeller to be lower in the water than it would be if it was connected directly to the engine flywheel.

It is another object of the present invention to provide an improved power take-off system which permits the power output shaft that leads to the propeller to be laterally offset from the location of the flywheel of the engine, to thereby enable two propellers from side-by-side engines to be spaced closer together than they would be if they were connected directly to the engine flywheel.

It is yet another object of the present invention to provide a power take-off system which permits the two marine engines of a ship to be located side-by-side so that more passenger space is provided in the boat while at the same time enabling the performance of the boat to be substantially improved by having the propellers located low in the waterline below the boat's hull and also spaced close together.

Further novel features and other objects of the present invention will become apparent from the following detailed description, discussion and the appended claims, taken in conjunction with the drawings.

DRAWING SUMMARY

Referring to the drawings for the purpose of illustration only and not limitation, there is illustrated:

DETAILED DESCRIPTION OF THE PREFERRED EMBODIMENT

The present power take-off system for marine engines can operate in conjunction with transmission shift mechanisms which are hydraulically actuated, manually actuated or of a crash box racing type actuation system. The present invention will first be described for use in conjunction with a hydraulic system. The purpose of this power take-off is to transfer the engine's power to an outdrive system, in a forward, reverse or neutral (no rotation) rotation. The hydraulic shift mechanism will allow the power take-off to be shifted while the engine is running, and in a smooth fashion.

Figure 1:
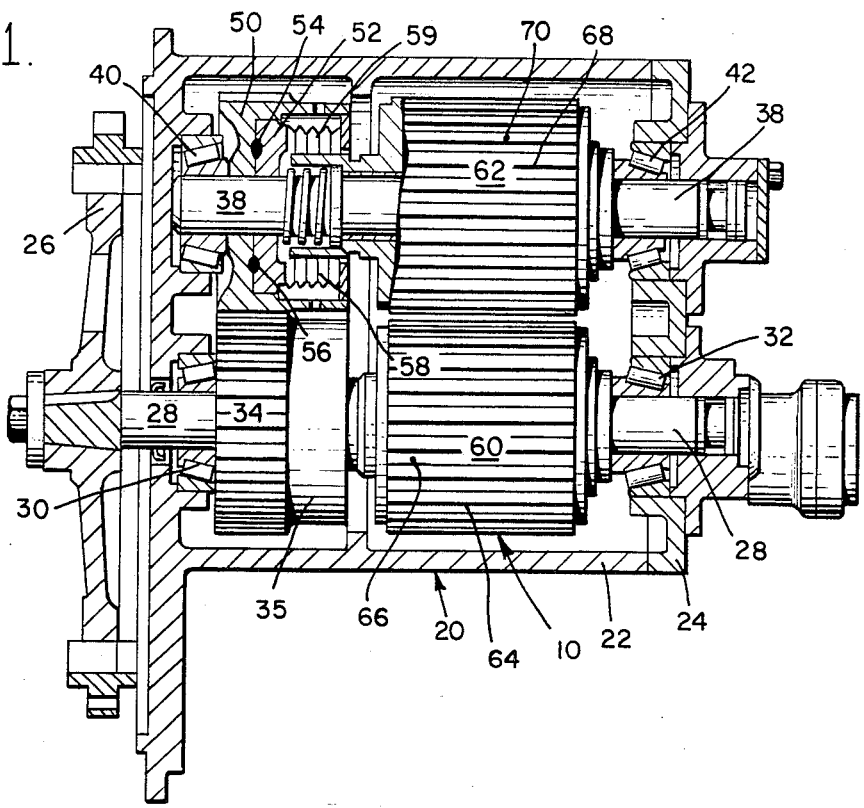
FIG. 1 is a cross-sectional view of the present power take-off system utilized with a hydraulically actuated transmission.

The present invention is shown in the cross-sectional view of FIG. 1. The present invention power take-off system 10 is contained within a triangular shaped housing member 20. This housing 20 can be covered with another casting cover (not shown). By way of example only, the housing member 20 may be made of two separate castings, 22 and 24, which are machined to fit together as shown in FIG. 1. The housing 20 is designed to seal in lubrication oil for the moving parts of the present invention and to seal out foreign matter. In the preferred embodiment, the housing 20 is bolted directly to the engine bellhousing adapter located at the rear of the engine. As depicted in FIG. 1, coupling means such as an insulating coupling 26 is used to transfer engine power directly from the flywheel of the engine (not shown) to the input shaft 28 of the power take-off system which protrudes through the front of the housing 20.

The input shaft 28 is powered by the engine (not shown). Power is transferred to other parts of the transmission portion of the power take-off system through the input shaft 28. The input shaft 28 is supported by front bearings 30 and rear bearings 32, located on each respective end of the shaft 28, thereby allowing the input shaft 28 to rotate within the housing 20. The end of the input shaft 28, located within the housing, is attached to a first gear 34, also located within housing 20. The input shaft 28 and the first gear 34 will always rotate with the engine when the engine is running. The first gear 34 also is attached adjacent a hydraulic clutch pack assembly 35, as will be more fully described hereafter.

Running parallel to but spaced apart from the input shaft 28 is an idler shaft 38. The idler shaft 38 is supported by front bearings 40 on one end and by rear bearing 42 on the other end. A second gear 50 is attached to the idler shaft 38 adjacent its front part so that it is intermeshed with first gear 34. The second gear 50 will therefore always rotate in a direction opposite to the rotation of the first gear 34. Therefore, while the input shaft and first gear will rotate in the same direction as the engine, the idler shaft and second gear rotate in the opposite direction of the engine.

Located adjacent second gear 50 is a hydraulically actuated piston 52. When hydraulic chambers 54 and 56 are filled with lubricant or oil, the piston moves to compress disc packs 58 and 59. This compression of the disc packs serves to transfer power from the idler shaft 38 to the chain drive portion of the power take-off system 10. When the hydraulic pressure is released from piston 52, the piston 52 is returned to the neutral position and no engine power is transferred. A comparable piston and disc pack assembly 35 is located adjacent the first gear 34. Therefore, when both piston and disc pack assemblies are disengaged, no power is transferred from either the input shaft 28 or the idler shaft 38 to the chain drive assemblies.

Located on the rear portion of input shaft 28 is a first chain drive sprocket assembly 60. Located on the rear of idler shaft 38 is a second chain drive sprocket assembly 62. Each sprocket assembly is mounted on bearings (not shown) located between the shafts and the sprocket assembly. Each sprocket assembly 60 and 62 is essentially a drum which contains sprockets on its outermost periphery. First sprocket assembly 60 contains a circular surface of sprockets 64 on its surface 66. Second sprocket assembly 62 contains a circular surface of sprockets 68 on its surface 70. Since each sprocket assembly is located on bearings, each sprocket assembly can spin freely on its respective shaft when the disc pack or clutch mechanism located on that shaft is disengaged.

Figure 2:
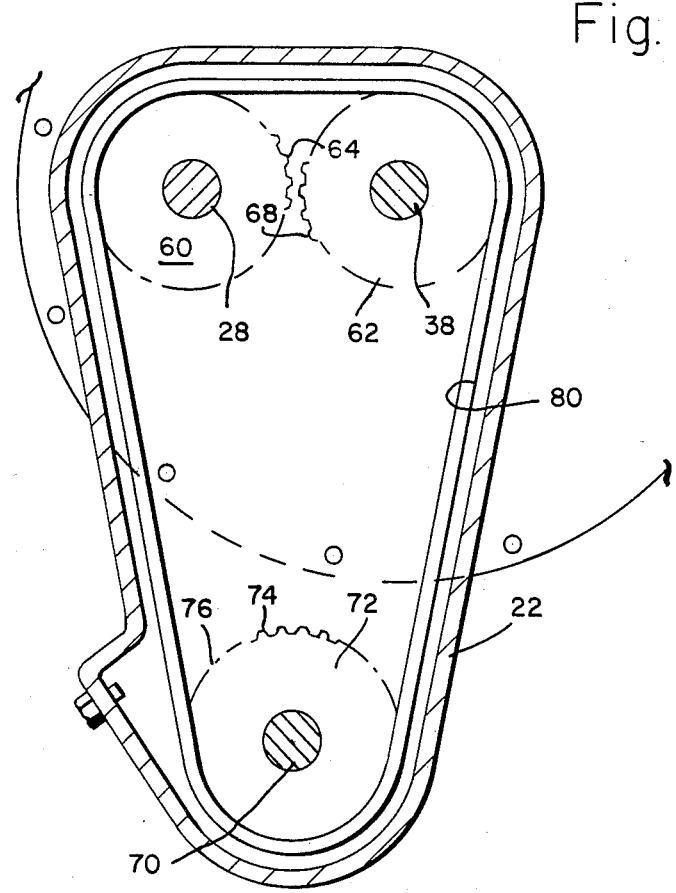
FIG. 2 is a cross-sectional view of the three sprocket assemblies used with the power take-off system illustrated in FIG. 1.

A key element of the present invention is the inclusion of a third shaft and sprocket assembly located within the housing 20 and at a distance below the first and second sprocket assemblies. This is shown in the cross-sectional view of FIG. 2. Input shaft 28 is surrounded by first sprocket assembly 60. Idler shaft 38 is surrounded by second sprocket assembly 62. The third shaft, which is the output shaft 70, is located below the other two shafts. By way of example only, third shaft 70 may be approximately sixteen (16) inches below input shaft 28 and idler shaft 38. Output shaft 70 is mounted on bearings within housing 20, in a fashion comparable to the bearing arrangements for the input shaft 28 and idler shaft 38. Therefore, the output shaft 70 can also rotate freely in either direction. The output shaft 70 protrudes through the rear of the housing 20 and the opening is sealed to prevent an oil leak. The output shaft 70 is directly connected to the outdrive system used in a boat by the use of a standard driveshaft assembly. The output shaft 70 is surrounded by a third sprocket assembly 72 which contains a circular surface row of sprockets 74 on its surface 76. The three sprocket assemblies are alligned so that sprocket surfaces 64, 68 and 74 are aligned. Sprocket surfaces 64, 68 and 74 are connected together by a band chain 80. Band chain 80 drives all three sprocket assemblies in either direction, all at the same time, in the same fashion.

In operation, when hydraulic pressure is diverted to one of the pistons located on either the input shaft or the idler shaft, the piston is forced against the disc packs as previously described and engages these clutches together. This set of discs or clutches will now turn and power the sprocket assembly located on the end of the shaft to which they are attached. Through interconnection with chain 80, all three sprocket assemblies are caused to rotate in the same direction under power from the engine. Three alternative things can occur. If the piston and disc pack clutch assembly located on the input shaft 28 is engaged, the first gear will be dominant and the three sprockets will rotate in the same direction that the engine is rotating. This in turn will cause the output shaft 70 to rotate in the engine direction. This can be considered to be the forward gear. If the piston and disc pack clutch assembly located on the idler shaft 38 is engaged, the second gear will be dominant and the three sprockets will rotate in the direction opposite to the rotation of the engine. Therefore, the output shaft 70 will also counter rotate the engine. This can be considered the reverse gear. In the third alternative occurrance, if neither piston or disc pack clutch assembly is engaged, the sprocket assemblies will be disengaged and the output shaft 70 will not rotate. This is the neutral position.

Figure 4:
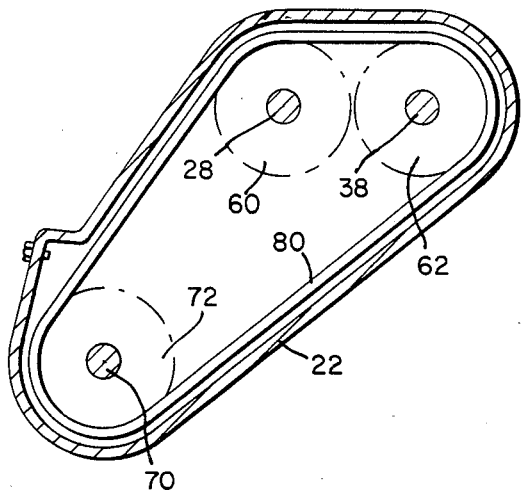
FIG. 4 is a cross-sectional view of the three sprocket assemblies shown in FIG. 2, with the lowermost sprocket assembly offset to the left.
Figure 3:
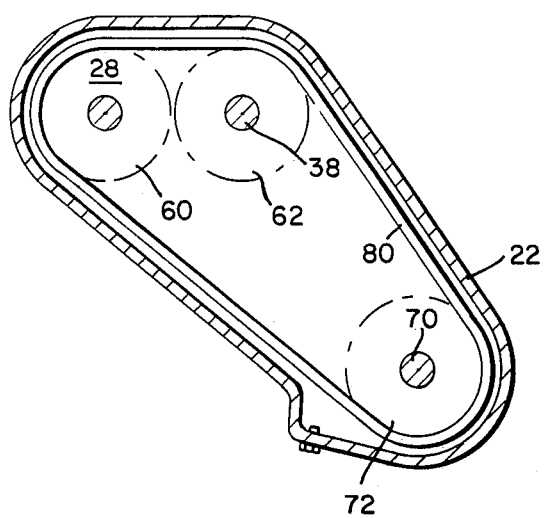
FIG. 3 is a cross-sectional view of the three sprocket assemblies shown in FIG. 2, with the lowermost sprocket assembly offset to the right.

Through use of the present invention 10, the entire transmission of rotational motion from the engine to the output shaft 70, is located within the power take-off housing 20. The output shaft 70 is connected to the driveshaft, which in turn is connected to the propeller of the boat. Since the output shaft 70 is lower than the input and idler shafts, which are substantially in the same plane, the propellers are therefore lower than the input and idler shafts and therefore lower than the engine drive. Therefore, through use of the third output shaft and the third sprocket assembly inside the housing, the propellers can be lower in the water than the engine level. This permits the engine to be placed any desired location in the boat while assuring that the propeller level will be sufficiently low in the water to assure that optimum performance will be achieved. In the preferred embodiment, the output shaft 70 can be approximately sixteen (16) inches below the input and idler shafts, which are substantially parallel. Other distances are certainly within the spirit and scope of the present invention. As shown in the FIG. 2, the output shaft 70 is centered between the substantially parallel input and idler shafts. This is only one of numerous alternative locations. As shown in FIG. 3, the output shaft 70 can be offset to the right. In an alternative embodiment shown in FIG. 4, the output shaft 70 can be offset to the left. Therefore, if two engines are placed side-by-side, the left engine can have a power take-off system of the present invention wherein the output shaft 70 is offset to the right as shown in FIG. 3 and the right engine can have a power take-off system of the present invention wherein the output shaft 70 is offset to the left as shown in FIG. 4. Therefore, the two engines can be side-by-side while the two output shafts can be closer together than the input power shafts leading from the engines. Therefore, the propellers can be placed closer together to further increase optimum performance of the boat. Therefore, through use of the present invention power take-off system 10, engines can be placed side-by-side in the boat to afford maximum passenger space and the propellers can be lowered deeper into the water than the level of the engines and can be set closer together than the engine flywheel power shafts. This significantly improves the performance of the boat.

Defined more broadly, the present invention is a power take-off system for marine engines comprising a housing member containing an input shaft, an idler shaft and an output shaft. Each of the three shafts is rotatably supported within said housing member. The input shaft and the idler shaft are in the same approximate horizontal plane and spaced parallel to each other. The output shaft is located at a distance below the input shaft and the idler shaft. The input shaft, the idler shaft, and the output shaft each contain a chain drive sprocket assembly which includes a drum mounted on the shaft and containing sprockets on the outer surface of the drum. The sprockets on the three drum surfaces of the three sprocket assemblies are aligned and connected by a band chain. Actuating means located on the input shaft and the idler shaft enable the three shafts and the respective sprocket assemblies to either rotate in a forward direction, a reverse direction or a neutral non-rotation position. The input shaft is connected to an engine and the output shaft is connected to an outdrive assembly which includes a driveshaft and a propeller.

Figure 5:
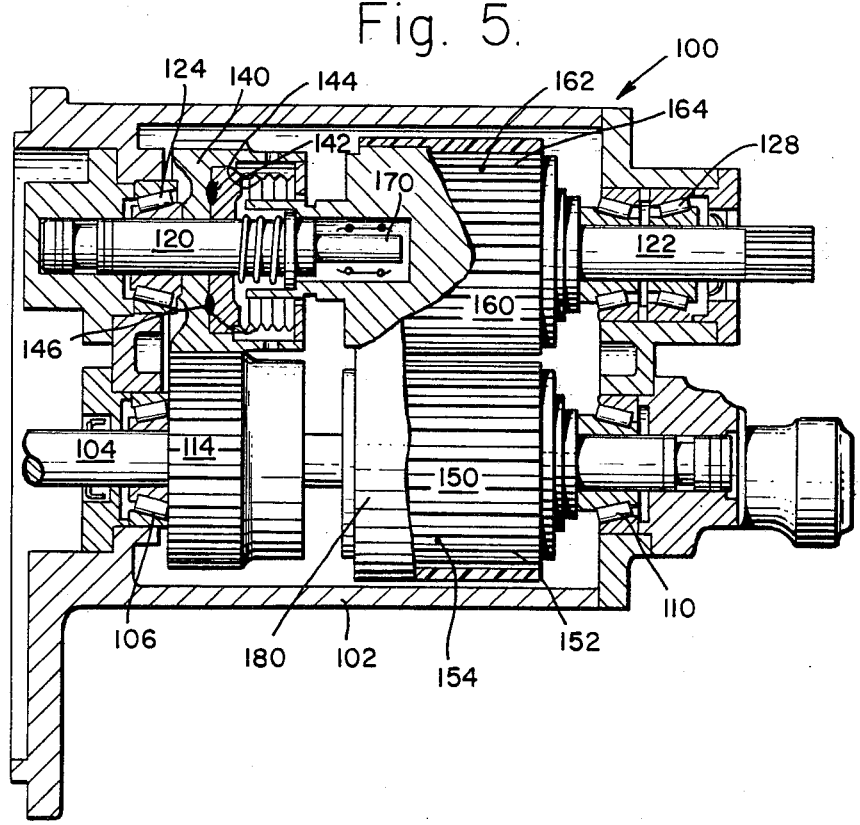
FIG. 5 is a cross-sectional view of an alternative embodiment of the present power take-off system utilized with a hydraulically actuated transmission.

An alternative embodiment to the present invention is shown in FIG. 5. In this alternative embodiment, the idler shaft and the second sprocket assembly are eliminated. Instead, the system contains only the input shaft and its related gear and sprocket assembly as described above, and the output shaft and its related gear and sprocket assembly as described above. In this embodiment, the output shaft is only a few inches, for example, six (6) inches below the input shaft. This power take-off system 100 is designed for outdrive systems that are not quite as offset from the engines as the previously described system. As in the previous embodiment, the housing member 102 is bolted directly to the engine bellhousing adapter in the rear of the engine (not shown). An insulating coupling is used to transfer engine power directly from the flywheel of the engine to the input shaft 104 of the take-off system 100. This input shaft 104 protrudes through the front of the housing and is used to transfer engine power directly from the flywheel of the engine to the input shaft 104 of the power take-off system 100. This input shaft 104 protrudes through the front of the housing 102 and is sealed with an oil seal to keep in the lubrication oil. As before, the input shaft 104 is powered by the engine which will transfer this power to the other parts of the power take-off system. As before, the input shaft 104 is supported by front bearing 106 and rear bearings 110, located on either end of input shaft 104. This allows the input shaft 104 to rotate within the housing 100. As before, the front part of the input shaft 104 has a first gear 114 attached to it inside the housing. As before, this first gear 114 and the input shaft 104 will always rotate with the engine when the engine is running. In this variation, the output shaft assembly consists of two shafts 120 and 122, located one in front of the other. Shafts 120 and 122 will rotate independent from each other. As before, the shafts are supported by front and rear bearing assemblies. Front bearings 124 for shaft 120, and rear bearings 128 for shaft 122 are shown in FIG. 5.

The front portion of first output shaft 120 has a second gear 140 attached to its end. Second gear 140 is intermeshed with first gear 114. Therefore, first output shaft 120 and second gear 140 will rotate in a direction opposite to first gear 114 and input shaft 104.

Adjacent to the first gear 114 is a piston and disc clutch pack assembly as previously described. Adjacent to the second gear 140 is another piston and clutch disc pack assembly as previously described. The piston 142 and clutch disc packs 144 and 146 on first output shaft 120 is shown in FIG. 5. As before, when engaged, the piston and clutch disc pack assembly will transfer power from the rotating shaft and gear to the chain drive assembly to which it is attached. As before, when the piston is moved hydraulically, the clutch packs engage under the force of the piston. When no hydraulic pressure is applied, the piston is returned by a spring to its neutral position and no engine power is transferred.

Located on the rear portion of input shaft 104 is a first chain drive sprocket assembly 150 which contains a circular surface of sprocket 152 on its surface 154. The first sprocket assembly 150 is mounted on a bearing located between the input shaft 104 and the sprocket assembly 150. Located on second output shaft 122 is a second sprocket assembly 160 which contains a circular surface of sprockets 162 on its surface 164. First and second output shafts 120 and 122 respectively are connected by bearing 170 which supports shafts and which permits the two shafts to rotate together or else rotate independently of each other. The first and second sprocket assemblies are aligned such that the band chain 180 interconnects sprockets 152 and 162. Second output shaft 122 is connected to the outdrive assembly, which is connected to the propeller. Sprocket surfaces 152 and 162 are aligned and are connected together by band chain 180. Therefore, when one sprocket assembly is caused to rotate, the other sprocket assembly will rotate.

Figure 6:
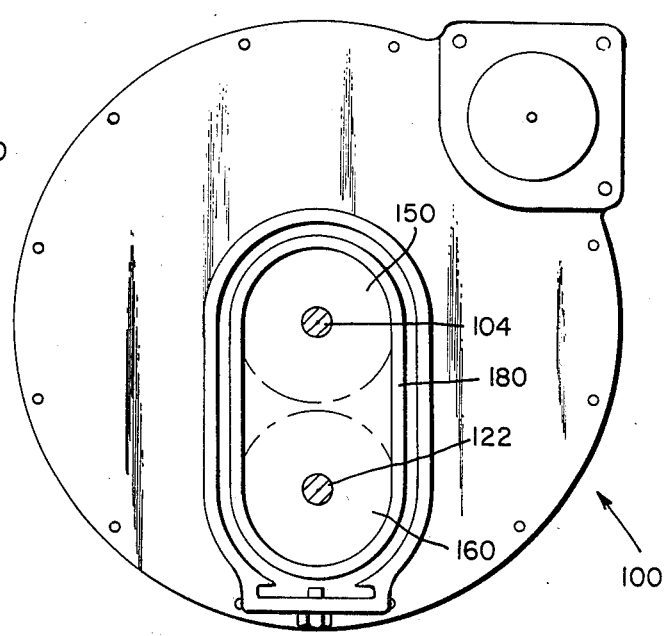
FIG. 6 is a cross-sectional view of the two sprocket assemblies used with the power take-off system illustrated in FIG. 5.

Through use of this system, as shown in FIG. 6, the second output shaft 122, which is connected by a driveshaft to the propeller, is lower than the engine flywheel and the power input shaft 104, thereby enabling the propeller to be lower in the water. This embodiment does not have the advantage of the previous embodiment in enabling the output shaft to be offset so that the propellers can be closer together. The output shaft also is not lowered by the same amount as in the previous embodiment. However, this embodiment is of simpler construction in requiring only two sprocket assemblies.

The operation of this embodiment 100 is as follows. If the clutch assembly on the input shaft is engaged by hydraulic means as previously described, the first sprocket assembly will be caused to rotate with the input shaft 104 and in the same direction as the engine. The first sprocket assembly will cause the second sprocket assembly to rotate in the same direction and this in turn will cause the second output shaft to rotate. This can be considered to be the forward direction. If only the second clutch assembly located on the first output shaft is engaged, then the two output shafts are engaged to rotate together and the second sprocket assembly 160 is also engaged to rotate. This rotation is in the direction opposite to the rotation of the engine, since the first gear 114 caused the second gear 140 to rotate and therefore the first and second output shafts to rotate in the direction opposite to the direction of rotation of the engine. The second sprocket assembly 160 causes the first sprocket to also rotate in this direction. This can be accomplished since the sprocket assemblies are on bearings and can rotate independently of the shaft on which they rest, if desired. This is the reverse rotation mode. If both hydraulic clutch assemblies are disengaged, then the power take-off system is in the neutral or no-rotation mode.

Defined more broadly, the present invention is a power take-off system for marine engines comprising a housing member containing an input shaft, a first output shaft and a second output shaft. Each of the three shafts is rotatably supported within the housing member. The first output shaft and the second output shaft are substantially aligned and located below and substantially parallel to the input shaft. The input shaft and the second output shaft each contain a chain drive sprocket assembly which includes a drum mounted on the shaft and containing sprockets on the outer surface of the drum. The sprockets on the two drum surfaces of the two sprocket assemblies are aligned and connected by a band chain. Actuating means located on the input shaft and the first output shaft enable the three shafts and the respective sprocket assemblies to either rotate in a forward direction, a reverse direction or a neutral non-rotation position. The input shaft is connected to an engine and the output shaft is connected to an outdrive assembly which includes a driveshaft and a propeller.

Figure 7:
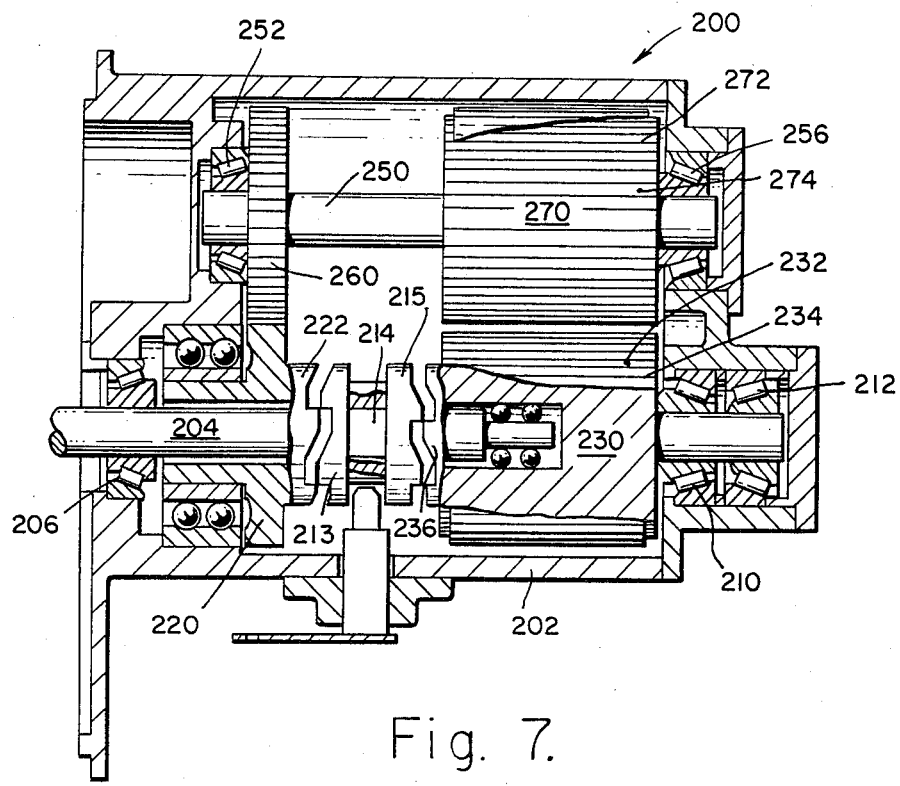
FIG. 7 is a cross-sectional view of an alternative embodiment of the present power take-off system utilized with a mechanically actuated transmission.

The more specific embodiments of the present invention have thus far been described through use with a hydraulically actuated transmission. It is emphasized that this is only one such actuating mechanism and the present invention power take-off system can be utilized with a multiplicity of actuating mchanisms. For example, the present invention can be used in conjunction with a manual shift mechanism. One such manual shift mechanism is illustrated in FIG. 7. As with the previous embodiments, this power take-off system 200 is contained inside housing 202. As before, the input power shaft 204 is coupled to the flywheel of an engine with an insulating coupling. As before, input shaft 204 is supported inside the housing by front bearing 206 and rear bearings 210. In this embodiment, the end of the input shaft 204 is splined, to accept a shift collar 214 that has a common spline. The collar 214 rotates with the engine when the engine is running. A first gear 220 is positioned on the input shaft 204. Bearing means, such as a ball bearing, is between the gear and the case to permit the first gear 220 to rotate in either direction. The open face of the first gear 220 contains a clawed surface 222. Located on the rear of the input shaft 204 is a first sprocket assembly 230 which carries a full surface of sprockets 232 on its exterior surface 234. The first sprocket assembly 230 is also mounted on bearings to allow free movement. The inward open face of the sprocket assembly 230 contains a clawed surface 236. The shift collar 214 contains a first clawed surface 213 and a second clawed surface 215, facing the clawed surfaces of the first gear and first sprocket assembly respectively. When centered between the first gear 220 and the first sprocket assembly 230, the collar 214 is totally disengaged from both. When the collar is meshed with the first gear or the sprocket assembly, the engine power from the input shaft is transferred to the sprocket assembly or the gear assembly.

Located next to and in the same plane as the input shaft assembly is the idler shaft assembly. The idler shaft 250 is supported within the housing 202 by front bearings 252 and rear bearings 256. As in previous configurations, attached to the idler shaft 250 is a second gear 260 which is intermeshed with first gear 220. Attached to the rear of the idler shaft 250 is a second sprocket assembly 270 which contains a surface of sprockets 272 on its exterior surface 274.

Figure 8:
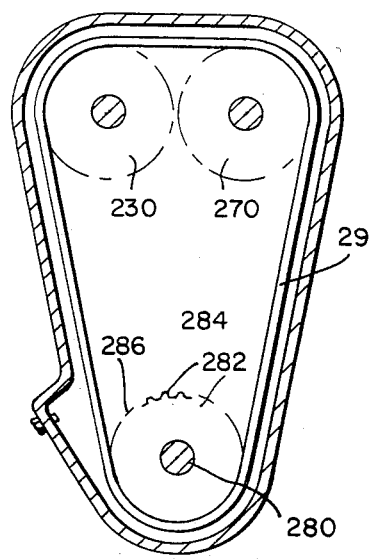
FIG. 8 is a cross-sectional view of the three sprocket assemblies used with the power take-off system illustrated in FIG. 7.

Located below the input and idler shafts, which are substantially parallel and in the same plane, is a power output shaft 280 as shown in FIG. 8. The output shaft is also supported by a bearing attached at each end of the output shaft 280. A third sprocket assembly 282 containing a surface of sprockets 284 on its outer surface 286 is located on the output shaft. All three sprocket assemblies, 230, 270 and 282, are aligned so that their sprocket surfaces are aligned. A band chain 290 interconnects the three sprocket assemblies. The band chain 290 connects with the various sprockets and permits the three sprocket assemblies to rotate in the same direction.

In operation, the above assembly operates as follows. When the shift collar 214 is located between the first gear 220 and the first sprocket assembly 230, the clawed edges are disengaged and only the input shaft 204 and collar 214 will rotate. This is the neutral position for the power take-off system. When the shift collar 214 is moved by the mechanical lever so that the collar 214 moves forward, the clawed edge 213 of the collar 214 is engaged to the clawed surface 222 of first gear 220. The first gear 220 rotates in the direction of the engine rotation. The first gear serves to cause the second gear 260 to rotate in the opposite direction. The idler shaft 250 also rotates in the counter engine direction and causes second sprocket assembly 270 to also rotate in this direction. Through the band chain 290 interconnection, all three sprocket assemblies rotate in this direction, and the output shaft 250 rotates in this counterengine direction, thereby causing the driveshaft and propellers to also rotate in this direction. This is the reverse mode. In the third mode, when the collar 214 is moved to the rear, the clawed surface 215 engages the clawed surface 236 of first sprocket assembly 230 and also disengages first gear 220. Now first sprocket assembly 230 is caused to rotate in the same direction as the engine, and through the band chain 290 interconnection, the second and third sprocket assemblies also rotate in the forward direction.

Therefore, through use of the mechanical actuating means described above, the power can be transferred to the lower output shaft and therefore the driveshaft and propellers can be set lower into the water. Referring once again to FIGS. 3 and 4, the third sprocket assembly and output shaft can be offset to the right or to the left respectively. Therefore, as previously described, even though the engines can be set wide apart, through use of this offset of the third sprocket assembly, the output shaft and therefore the driveshaft and propellers can be set closer together.

Another novel feature of the present invention is to vary the output ratio between the input shaft and the output shaft by varying the different size sprockets on the top two sprocket assemblies (first and second) and the third sprocket assembly on the output shaft. Through larger sprockets on the output shaft, a mechanical advantage can be achieved.

In a comparable fashion, instead of using three sprocket assemblies, only two sprocket assemblies can be used, but as before, then only the distance of the output shaft can be lowered and offset only a small amount. The distance can also only be about six inches as opposed to sixteen inches with the three sprocket assembly sets as described above.

In addition to permitting application with any type of actuating means such as hydraulic or mechanical, the present power take-off system invention can also be used with a novel differential assembly. In the boat racing field, it is desirable to have four power plants, wherein two power plants drive a single outdrive and propeller assembly. Since two engines which power one outdrive cannot be controlled at all times at the exact same revolutions per minute, they must be coupled together through a differential assembly. This differential assembly will allow one engine to run at a slightly different RPM than the other engine, while both engines are powering the same outdrive. This differential assembly will compensate for the difference in the engine RPMs, allowing the engines to run independently from each other. The differential assembly of the present invention is adaptable to all of the sixteen inch offset output powe takeoff systems of the present invention, including all manual shift or hydraulic shift objects.

The two engines used to power the driveshaft and propeller will be located one in front of the other, with the outdrive located directly behind the rear power take-off shaft. Both of the engines contain an offset power take-off system of the present invention, preferably the three sprocket assembly embodiment. The rear engine will also have the differential assembly installed on it. The differential assembly will handle the input power of both engines, and then compensate for the RPM difference; then power the outdrive, with no loss in power, for either of the engines.

Figure 9:
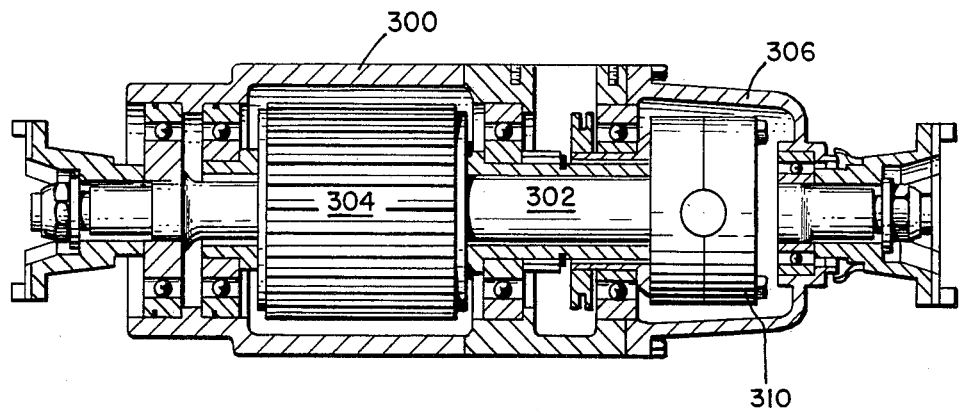
FIG. 9 is a cross-sectional view of a third sprocket assembly and an attached differential.
Figure 10:
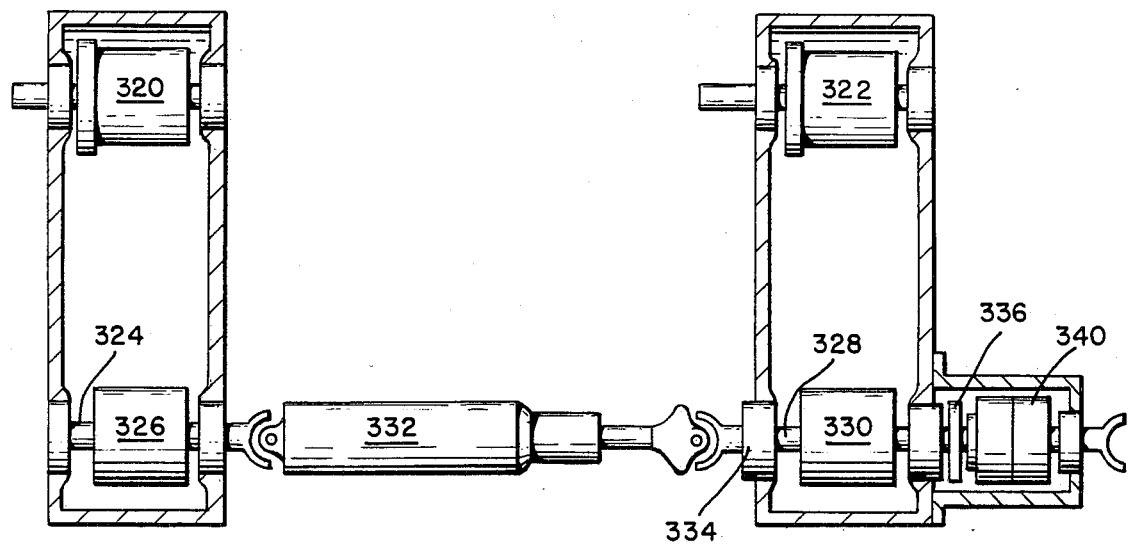
FIG. 10 is a schematic view of two engines using the present power take-off system in conjunction with a differential.

To install the differential assembly on the rear of the power take-off unit, it is necessary to replace the output shaft at the bottom of the power take-of system with a hollow output shaft. The differential case will then be bolted directly to the rear of the power take-off system case. The apparatus is shown in FIGS. 9 and 10. The lower portion of the power take-off case 300 contains the power take-off output shaft 302 and third sprocket assembly 304. The differential case 306 is bolted onto the rear of the power take-off case 300 and the differential 310 is contained within. A shaft from the differential is inserted into the hollow output shaft 302. A second shaft is also inserted into the opposite end of the hollow output shaft and this leads to a driveshaft, which in turn leads to the output shaft from the first engine. In FIG. 10, engine one is schematically shown at 320 and engine two at 322. The output shaft from the power take-off system for engine one is shown at 324 and the third sprocket assembly from this power take-off system is shown at 326. The hollow output shaft for the power take-off system for engine two is shown at 328 and the third sprocket assembly for this engine is shown at 330. An input shaft going from the driveshaft 332 and the power take-off system of engine one into the hollow output shaft 328 is shown at 334. The input shaft running from the inside of output shaft 328 to the differential 340 is shown at 336. The housing of the differential 340 is a two piece housing and is the actual output shaft that connects directly to the outdrive with the use of a driveshaft assembly. Through use of this differental assembly in combination with the power take-off system of the present invention, two engines can be used to power a single propeller, thereby adding this power, which is useful in racing boats.

What is claimed is:

1. A hydraulically actuated power take-off system for marine engines comprising:
   a. an input shaft connected to the flywheel of an engine through coupling means;
   b. bearing means supporting said input shaft so as to permit rotational movement of the input shaft;
   c. a first gear attached on said input shaft;
   d. a first hydraulic clutch pack assembly attached to said first gear;
   e. an idler shaft running in the same horizontal plane as and substantially parallel to and spaced apart from said input shaft;
   f. bearing means supporting said idler shaft so as to permit rotational movement of the idler shaft;
   g. a second gear attached on said idler shaft and configured to intermesh with said first gear;
   h. a second hydraulic clutch pack assembly attached to said second gear;
   i. a first chain drive sprocket assembly located on said input shaft and spaced apart from said first gear and first hydraulic clutch pack assembly;
   j. said first hydraulic clutch pack assembly being engagable with said first chain drive assembly so that power may be transferred from said first gear and said first hydraulic clutch pack assembly to said first chain drive assembly;
   k. said first chain drive sprocket assembly including a drum which is mounted on said input shaft by bearings and containing sprockets on the outer surface of the drum;
   l. a second chain drive sprocket assembly located on said idler shaft and spaced apart from said second gear and second hydraulic clutch pack assembly;
   m. said second hydraulic clutch pack assembly being engagable with said second chain drive assembly so that power may be transferred from said second gear and said second hydraulic clutch pack assembly to said second chain drive assembly;
   n. said second chain drive sprocket assembly including a drum which is mounted on said idler shaft by bearings and containing sprockets on the outer surface of the drum;
   o. an output shaft located below said input shaft and said idler shaft;
   p. bearing means supporting said output shaft so as to permit rotational movement of the output shaft;
   q. a third chain drive sprocket assembly located on said output shaft;
   r. said third chain drive sprocket assembly including a drum which is mounted on said output shaft and containing sprockets on the outer surface of the drum;
   s. said first chain drive sprocket assembly, said second chain drive sprocket assembly, and said third chain drive sprocket assembly substantially in alignment so that the three drum surfaces containing sprockets are aligned;
   t. the sprockets on the three drum surfaces of the three sprocket assemblies being connected by a band chain;
   u. a housing member encasing all of the above elements of the power take-off system; and
   v. the rear end of said output shaft protruding through the rear of said casing and connected to an outdrive assembly which includes a driveshaft and a propeller.

2. The invention as defined in claim 1 wherein said output shaft is located approximately sixteen inches below said input shaft and said idler shaft.

3. The invention as defined in claim 1 wherein said output shaft is vertically aligned below and between said input shaft and said idler shaft.

4. The invention as defined in claim 1 wherein said output shaft is offset to the left of said input shaft and said idler shaft.

5. The invention as defined in claim 1 wherein said output shaft is offset to the right of said input shaft and said idler shaft.

6. The invention as defined in claim 1 wherein two engines with power take-off systems as defined in claim 1 are aligned one in front of the other, the output shaft of the power take-off system of the second engine being hollow, the output shaft of the power take-off system of the first engine is connected to a driveshaft, the driveshaft in turn is connected to an interconnecting input shaft which in turn is connected to and inserted into the front end of the hollow output shaft of the power take-off system of the second engine, and a shaft from a differential assembly is connected to and inserted into the rear end of the hollow output shaft of the power take-off system of the second engine.

7. A hydraulically actuated power take-off system for marine engine comprising:
   a. an input shaft connected to the flywheel of an engine through coupling means;
   b. bearing means supporting said input shaft so as to permit rotational movement;
   c. a first gear attached on said input shaft;
   d. a first hydraulic clutch pack assembly attached to said first gear;
   e. a first output shaft located below and substantially parallel to and spaced apart from said input shaft;
   f. bearing means supporting said output shaft so as to permit rotational movement of the first output shaft;
   g. a second gear attached on said first output shaft and configured to intermesh with said first gear;
   h. a second hydraulic clutch pack assembly attached to said second gear;
   i. a second output shaft located adjacent the rear end of said first output shaft and aligned with said first output shaft;
   j. bearing means supporting said second output shaft so as to permit rotational movement of the second output shaft;
   k. said first and second output shafts interconnected by a bearing which permits the two output shafts to either rotate together or rotate independently of each other;
   l. a first chain drive sprocket assembly located on said input shaft and spaced apart from said first gear and first hydraulic clutch pack assembly;
   m. said first hydraulic clutch pack assembly being engagable with said first chain drive sprocket assembly so that power may be transferred from said first gear and said first hydraulic clutch pack assembly to said first chain drive sprocket assembly;
   n. said first chain drive sprocket assembly including a drum which is mounted on said input shaft by bearings and containing sprockets on the outer surface of the drum;
   o. a second chain drive sprocket assembly located on said second output shaft;
   p. said second hydraulic clutch pack assembly being engagable with said second chain drive sprocket assembly so that power may be transferred from said second gear and said second hydraulic clutch pack assembly to said second chain drive sprocket assembly;
   q. said second chain drive sprocket assembly including a drum which is mounted on said second output shaft and containing sprockets on the outer surface of the drum;
   r. said first chain drive sprocket assembly and said second chain drive sprocket assembly substantially in alignment so that the two drum surfaces containing sprockets are aligned;
   r. the sprockets on the two drum surfaces of the two sprocket assemblies being connected by a band chain;
   s. a housing member encasing all of the above elements of the power take-off system; and
   t. the rear end of said second output shaft protruding through the rear of said casing and connected to an outdrive assembly which includes a driveshaft and a propeller.

8. The invention as defined in claim 7 wherein two engines with power take-off systems as defined in claim 7 are aligned one in front of the other, the output shaft of the power take-off system of the second engine being hollow, the output shaft of the power take-off system of the first engine is connected to a driveshaft, the driveshaft in turn is connected to an interconnecting input shaft which in turn is connected to and inserted into the front end of the hollow output shaft of the power take-off system of the second engine, and a shaft from a differential assembly is connected to and inserted into the rear end of the hollow output shaft of the power take-off system of the second engine.

9. A mechanically actuated power take-off system for marine engines comprising:
   a. an input shaft connected to the flywheel of an engine through coupling means;
   b. the middle of said input shaft being splined to accept a shift collar;
   c. bearing means supporting said input shaft so as to permit rotational movement;
   d. a first gear supported on said input shaft by bearing means;
   e. the rear face of said first gear containing a clawed surface;
   f. a first chain drive sprocket assembly located on said input shaft and spaced apart from said first gear;
   g. said first chain drive sprocket assembly including a drum which is mounted on said input shaft by bearings and containing sprockets on the outer surface of the drum;
   h. the surface of the drum facing said first gear containing a clawed surface;
   i. a shift collar containing first and second clawed surfaces located between said first gear and said first sprocket assembly such that if the shift collar is in the front position its first clawed surface can engage with the clawed surface of the first gear, if the shift collar is in rear position its second clawed surface can engage with the clawed surface of the drum of the first chain drive sprocket assembly, and if the shift collar in the center position it does not engage with any clawed surface;
   j. an idler shaft running in the same horizontal plane and substantially parallel to and spaced apart from said input shaft;
   k. bearing means supporting said idler shaft so as to permit rotational movement of the idler shaft;
   l. a second gear attached to said idler shaft and configured to intermesh with said first gear;
   m. a second chain drive sprocket assembly located on said idler shaft and spaced apart from said second gear;
   n. said second chain drive sprocket assembly including a drum which is mounted on said idler shaft and containing sprockets on the outer surface of the drum;
   o. an output shaft located below said input shaft and said idler shaft;
   p. bearing means supporting said output shaft so as to permit rotational movement of the output shaft;
   q. a third chain drive sprocket assembly located on said output shaft;
   r. said third chain drive sprocket assembly including a drum which is mounted on said output shaft and containing sprockets on the outer surface of the drum;

s. said first chain drive sprocket assembly, said second chain drive sprocket assembly, and said third chain drive sprocket assembly substantially in alignment so that the three drum surfaces containing sprockets are aligned;

t. the sprockets on the three drum surfaces of the three sprocket assemblies being connected by a band chain;

u. a housing member encasing all of the above elements of the power take-off system; and v. the rear end of said second output shaft protruding through the rear of said casing and connected to an outdrive assembly which includes a driveshaft and a propeller.

10. The invention as defined in claim 4 wherein said output shaft is located approximately sixteen inches below said input shaft and said idler shaft.

11. The invention as defined in claim 4 wherein said output shaft is vertically aligned below and between said input shaft and said idler shaft.

12. The invention as defined in claim 4 wherein said output shaft is offset to the left of the input shaft and idler shaft.

13. The invention as defined in claim 4 wherein said output shaft is offset to the right of said input shaft and said idler shaft.

14. The invention as defined in claim 4 wherein two engines with power take-off systems as defined in claim 4 are aligned one in front of the other, the output shaft of the power take-off system of the second engine being hollow, the output shaft of the power take-off system of the first engine is connected to a driveshaft, the driveshaft in turn is connected to an interconnecting input shaft which in turn is connected to and inserted into the front end of the hollow output shaft of the power take-off system of the second engine, and a shaft from a differential assembly is connected to and inserted into the rear end of the hollow output shaft of the power take-off system of the second engine.

* * * * *